United States Patent
Wilcox

(10) Patent No.: US 9,488,350 B2
(45) Date of Patent: Nov. 8, 2016

(54) RECESSED LIGHTING FIXTURE AND FLEXIBLY ATTACHED COMPACT JUNCTION BOX

(71) Applicant: Hubbell Incorporated, Shelton, CT (US)

(72) Inventor: Shawn A. Wilcox, Gray Court, SC (US)

(73) Assignee: Hubbell Incorporated, Shelton, CT (US)

( * ) Notice: Subject to any disclaimer, the term of this patent is extended or adjusted under 35 U.S.C. 154(b) by 59 days.

(21) Appl. No.: 14/642,376

(22) Filed: Mar. 9, 2015

(65) Prior Publication Data

US 2015/0260383 A1  Sep. 17, 2015

Related U.S. Application Data

(63) Continuation of application No. 14/494,919, filed on Sep. 24, 2014, now Pat. No. 8,995,114, which is a continuation of application No. 13/466,533, filed on May 8, 2012, now Pat. No. 8,854,796.

(60) Provisional application No. 61/483,912, filed on May 9, 2011.

(51) Int. Cl.
| | |
|---|---|
| H02B 1/26 | (2006.01) |
| F21V 23/00 | (2015.01) |
| F21S 8/02 | (2006.01) |
| F21V 23/02 | (2006.01) |
| F21K 99/00 | (2016.01) |
| H02B 1/40 | (2006.01) |
| H02B 1/48 | (2006.01) |
| F21V 29/70 | (2015.01) |
| F21V 7/00 | (2006.01) |

(Continued)

(52) U.S. Cl.
CPC ............ *F21V 23/001* (2013.01); *F21K 9/90* (2013.01); *F21S 8/026* (2013.01); *F21V 7/00* (2013.01); *F21V 23/008* (2013.01); *F21V 23/023* (2013.01); *F21V 23/026* (2013.01); *F21V 29/70* (2015.01); *H02B 1/40* (2013.01); *H02B 1/48* (2013.01); *F21V 21/044* (2013.01); *F21V 29/78* (2015.01); *F21Y 2101/02* (2013.01); *Y10T 29/49117* (2015.01); *Y10T 29/5313* (2015.01)

(58) Field of Classification Search
CPC ........ F21V 23/023; F21S 8/026; H02B 1/48; H02B 1/40; F21K 9/90
See application file for complete search history.

(56) References Cited

U.S. PATENT DOCUMENTS

| | | |
|---|---|---|
| 861,813 A | 7/1907 | Cook |
| 2,887,525 A | 5/1959 | Lewus |

(Continued)

OTHER PUBLICATIONS

Lightolier Instruction Sheet No. IS:C2L_DL FIK, Philips Group, 2009.

(Continued)

*Primary Examiner* — Gregory Thompson
(74) *Attorney, Agent, or Firm* — Michael Best & Friedrich, LLP

(57) ABSTRACT

A recessed lighting fixture includes a lamp housing and a separate compact junction box, which contains a power supply that drives the lamp and serves in part to divide the interior cavity of the junction box into two separate wiring compartments. The junction box has two end walls spaced along an axis and a releasably secured. The lighting fixture is particularly suitable for retrofit installations, especially where small aperture downlights are desired.

20 Claims, 16 Drawing Sheets

(51) Int. Cl.
*F21V 21/04* (2006.01)
*F21Y 101/02* (2006.01)
*F21V 29/78* (2015.01)

(56) References Cited

U.S. PATENT DOCUMENTS

| | | | |
|---|---|---|---|
| 4,070,083 | A | 1/1978 | DiPalma |
| 4,234,146 | A | 11/1980 | Shima et al. |
| 4,323,724 | A | 4/1982 | Shine |
| 4,518,830 | A | 5/1985 | Drexler et al. |
| 4,829,410 | A | 5/1989 | Patel |
| 4,880,387 | A | 11/1989 | Stikeleather et al. |
| 4,900,266 | A | 2/1990 | Sainsbury et al. |
| 5,370,546 | A | 12/1994 | Evanisko |
| 5,588,737 | A | 12/1996 | Kusmer |
| 5,664,869 | A | 9/1997 | Bitton |
| 5,957,574 | A | 9/1999 | Hentz et al. |
| 6,079,851 | A * | 6/2000 | Altman ............ F21S 8/02 362/217.05 |
| 6,123,438 | A | 9/2000 | Hentz |
| 6,254,257 | B1 * | 7/2001 | Sieczkowski ........ F21S 8/02 362/215 |
| 6,428,190 | B1 | 8/2002 | Herst et al. |
| 6,659,627 | B2 | 12/2003 | Caluori |
| 6,699,063 | B2 | 3/2004 | Lebender |
| 6,831,222 | B2 | 12/2004 | Pastuch |
| 6,940,016 | B1 | 9/2005 | Cornett et al. |
| 6,994,457 | B2 | 2/2006 | Lee |
| 7,078,619 | B2 | 7/2006 | Chamberlain |
| 7,118,254 | B2 | 10/2006 | Czech |
| 7,148,431 | B2 | 12/2006 | Pyron |
| 7,357,541 | B2 * | 4/2008 | Gamache ........... F21S 8/02 174/58 |
| 7,401,961 | B2 | 7/2008 | Longatti et al. |
| 7,438,433 | B1 | 10/2008 | Steadman et al. |
| 7,586,039 | B1 | 9/2009 | Gretz |
| 7,614,769 | B2 * | 11/2009 | Sell ............... F21S 8/026 362/147 |
| 7,677,770 | B2 | 3/2010 | Mazzochette |
| 7,748,868 | B2 * | 7/2010 | Patti ............... F21S 8/02 362/147 |
| 7,824,213 | B1 | 11/2010 | Korcz et al. |
| 7,905,637 | B2 | 3/2011 | Caluori et al. |
| 8,021,007 | B2 | 9/2011 | Rapeanu et al. |
| 8,287,142 | B2 | 10/2012 | Pickard et al. |
| 8,480,268 | B2 | 7/2013 | Wilson et al. |
| 2006/0232970 | A1 | 10/2006 | Cheng |
| 2012/0044703 | A1 | 2/2012 | Wilson et al. |
| 2013/0312995 | A1 | 11/2013 | Sella et al. |

OTHER PUBLICATIONS

Prima Catalog Pose for Cat. No. 8742, Prima Lighting, 2009.

* cited by examiner

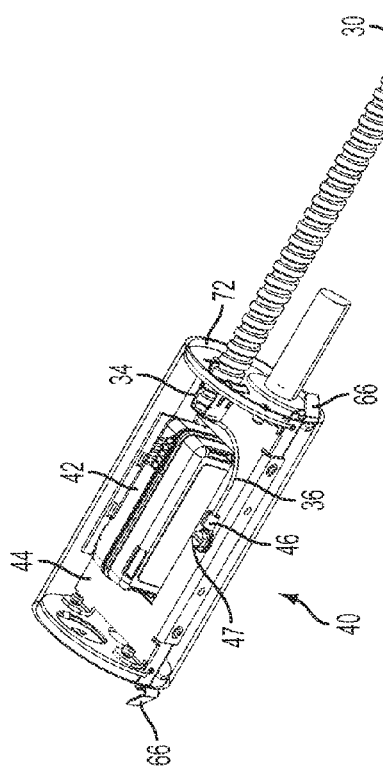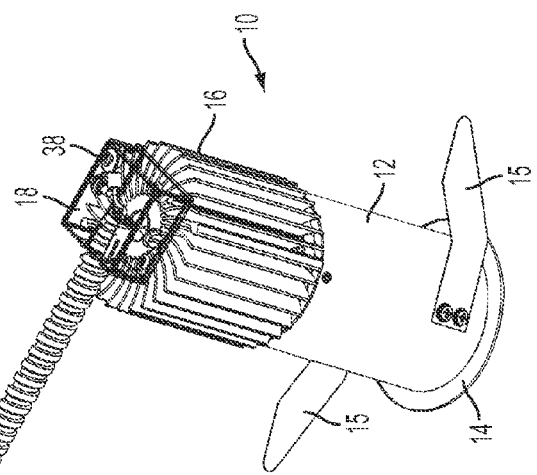
FIG. 2

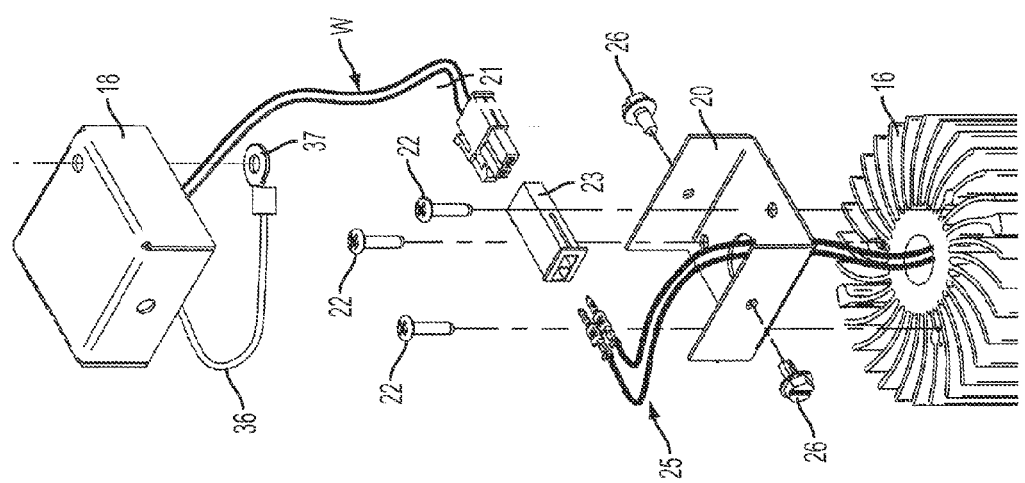

RECESSED LIGHTING FIXTURE AND FLEXIBLY ATTACHED COMPACT JUNCTION BOX

CROSS-REFERENCE TO RELATED APPLICATIONS

This application is a continuation of U.S. patent application Ser. No. 14/494,919, filed on Sep. 24, 2014, which is a continuation of U.S. patent application Ser. No. 13/466,533, filed on May 8, 2012, now U.S. Pat. No. 8,854,796, which claims priority from provisional application Ser. No. 61/483,912, filed May 9, 2011, the disclosures of which are incorporated herein by reference in their entirety.

FIELD OF THE INVENTION

The invention relates to lighting fixtures and junction boxes, and to recessed lighting fixture assemblies in which the associated junction box is connected to the lamp housing by a flexible conduit.

BACKGROUND OF THE INVENTION

Certification standards of Underwriters Laboratories Inc. (UL) require that a recessed lighting fixture be designed and constructed to allow room-side access to the junction box where the branch circuit connections to the lighting fixture are made as well as access to any associated electrical component (transformer, ballast, driver, etc.). Access must be through an opening not less than six inches across. UL standards also require that the junction box be integral to the lighting fixture or securely fastened to its enclosure or frame. If the junction box is attached by a flexible conduit, it must have "additional means of securement."

Many recessed lighting fixtures have their associated junction boxes and other components (transformer, ballast, driver, etc.) disposed laterally of the housing that contains the lamp assembly. In a traditional arrangement for lighting fixtures having an aperture of six inches or larger, the lamp housing, the junction box and other components are supported on a common pan or frame, which is secured to the adjacent building structure (joists, ceiling grid, etc.). A releasable connection between the lamp housing and the pan or frame allows the lamp housing to be dislodged and withdrawn from the ceiling opening to permit access to the nearby junction box and other components. In another common arrangement, often used in retrofit applications or other situations where the entire lighting fixture is to be supported only by an existing ceiling, the junction box and other components are supported on a laterally extending strut or arm attached to the lamp housing, usually forming a generally L-shaped unit. The lighting fixture is installed from below the ceiling through a ceiling opening that closely surrounds the lower end of the lamp housing when fully seated. The lighting fixture is removable through the same opening for servicing and access to the junction box. The size of the ceiling opening dictates the maximum size of the junction box and any other lighting fixture component, which must fit through the opening during installation and also during removal for servicing.

Many L-shaped retrofit assemblies can be somewhat difficult to install and remove, especially in situations where joist spacing is tight or where obstructions such as joist blocking, ductwork or piping are located close to the lighting fixture installation hole. Further, the small installation holes (e.g., 2⅞ inch or smaller) required for small aperture lamp housings make junction box miniaturization challenging, especially where the junction box must house a transformer, driver or other component. When above-ceiling access is available from the room through a properly sized auxiliary opening, a standard junction box can be used. Otherwise the usual solution is to mount the transformer or driver in an accessible remote location, which requires additional labor and materials.

SUMMARY OF THE INVENTION

One aspect of the invention concerns a compactly packaged junction box assembly for electrically powering a load. Such an assembly comprises a housing enclosing a cavity; a power supply within the cavity having an input side for receiving power from a source and an output side for delivering power to a load; and a chassis within the cavity supporting the power supply and substantially dividing the cavity into first and second wiring compartments. The power supply is situated in an aperture in the chassis with the input side facing the first compartment and the output side facing the second compartment.

In this assembly, the power supply preferably occupies a portion of each wiring compartment and is supported on a mounting flange at one edge of the aperture. The overall shape of the housing preferably is cylindrical. Openings in the housing's end walls communicate with the two wiring compartments to enable wiring to both sides of the power supply.

Another aspect of the invention concerns an arrangement of junction box features that facilitate access to its interior. The arrangement includes an axially extending support in the junction box cavity carrying two axially spaced end walls, and a releasably secured side wall surrounding and closing the cavity between the end walls. When released, the side wall is movable axially in either direction relative to the end walls to open and permit access to the cavity.

This arrangement preferably includes a resiliently biased retractable stop near each end wall that engages and releasably secures the side wall in a closed position surrounding the cavity. Each retractable stop, which may be a portion of a spring clip, preferably engages a respective end of the side wall when in its closed position. The overall shape of the junction box preferably is cylindrical. Openings in the end walls communicate with the cavity.

The invention also concerns a lighting fixture assembly that includes a junction box or junction box assembly as described above flexibly attached to a lamp housing containing a lamp assembly. A flexible conduit interconnects the junction box and the lamp housing with wiring therein for supplying power to the lamp assembly. A flexible tether, which preferably runs through the flexible conduit, has one end anchored to the lamp housing and the other end anchored to the junction box. The length of the tether prevents undue strain on the wiring and its connections, and preferably prevents undue strain on the flexible conduit.

BRIEF DESCRIPTION OF THE DRAWINGS

Preferred embodiments of the disclosed invention, including the best mode for carrying out the invention, are described in detail below, purely by way of example, with reference to the accompanying drawing, in which:

FIG. 2 is a perspective view of the lighting fixture of FIG. 1, with some parts removed for clarity and with top housing 18 and cylindrical cover 72 shown as transparent to reveal inner details;

FIG. 3A is an exploded perspective view of the upper portion of the lamp housing of FIG. 3, showing an alternative wiring arrangement;

DETAILED DESCRIPTION OF THE INVENTION

Figure 1:
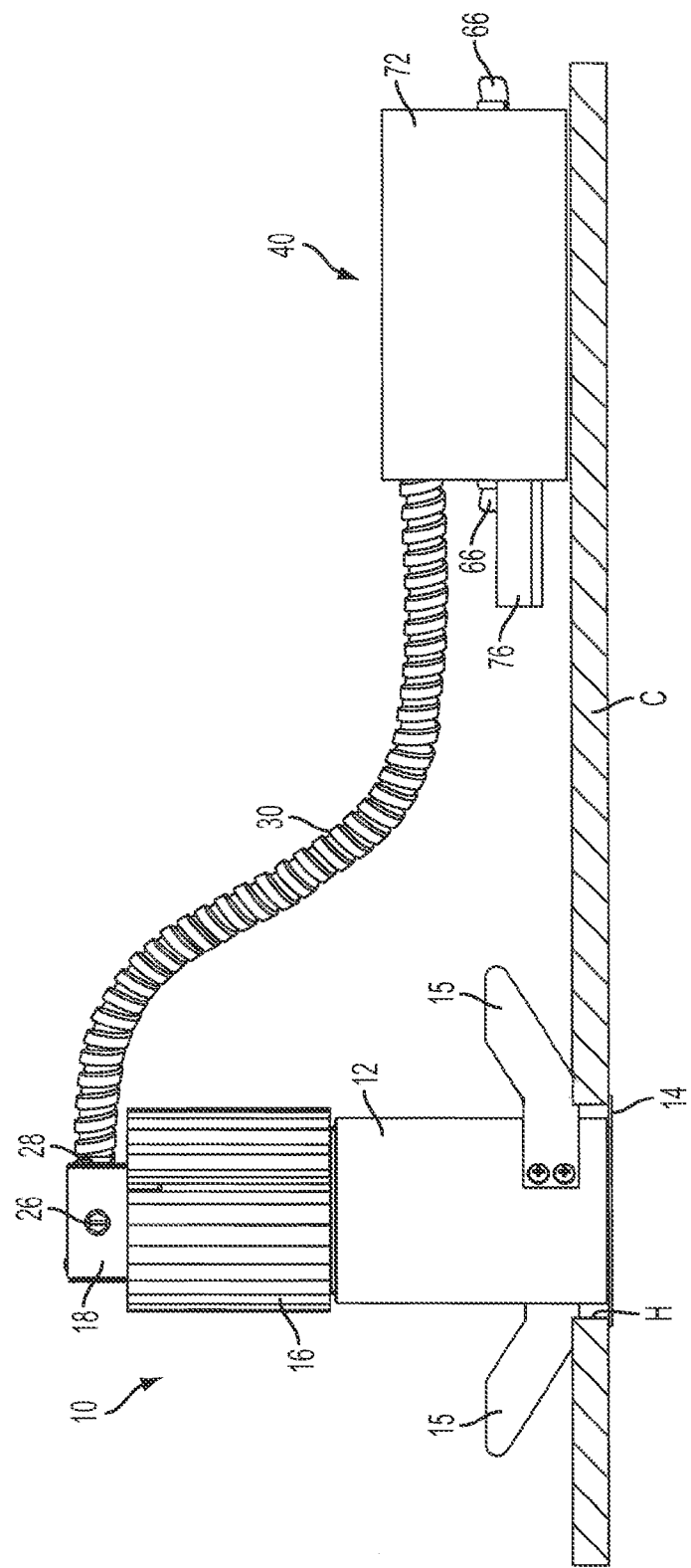
FIG. 1 is a side elevational view of the recessed lighting fixture of the invention installed in and above a ceiling.
Figure 3:
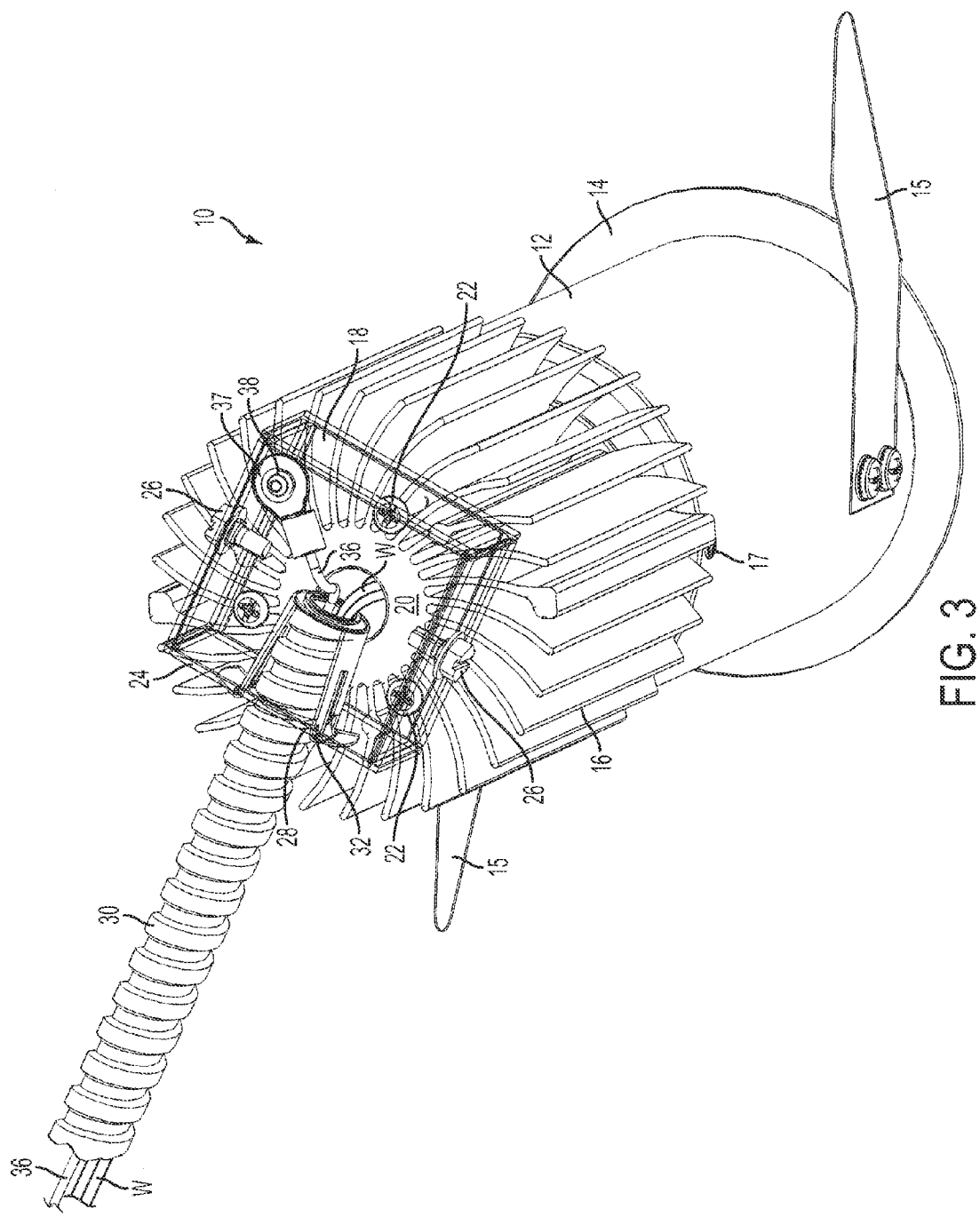
FIG. 3 is an enlarged perspective view of the lamp housing portion of the lighting fixture of FIG. 1, with top housing 18 shown as transparent.

Referring to FIGS. 1-5, a lighting fixture according to the invention comprises a lamp housing 10, a junction box assembly 40 and a flexible metal conduit 30 interconnecting the lamp housing and the junction box and protecting wiring within. Lamp housing 10 comprises a metallic tubular lower body 12, a finned metallic upper housing 16 and a metallic, generally square two-part top housing 18 (shown as transparent in FIGS. 2, 3 and 4). Lower body 12 houses a removable reflector 13 having a bottom annular trim flange 14; and it has two tangential, oppositely directed retention springs 15 that removably secure the lamp housing 10 in a properly sized installation hole H in ceiling C, with trim flange 14 bearing against the lower surface of the ceiling. Junction box 40 simply rests on the ceiling near the lamp housing.

Three screws 22 securely fasten the three-sided, U-shaped bottom half 20 of top housing 18 to fins of upper housing 16. The inverted box-shaped top half 24 of top housing 18 fits over and is secured to the upstanding sides of bottom half 20 by two screws 26. One end of conduit 30 is received in an aperture 28 in one side of top half 24 and is retained therein by a suitable wire-protecting metallic connector 32, such as the flanged connector disclosed in U.S. Pat. No. 4,880,387 (incorporated herein by reference). The same or a similar connector 34 secures the other end of conduit 30 to an end of junction box 40. The conductivity afforded by these connectors enables metallic conduit 30 to provide an electrical grounding path from lamp housing 10 to junction box 40, which is grounded as described below.

Figure 4:
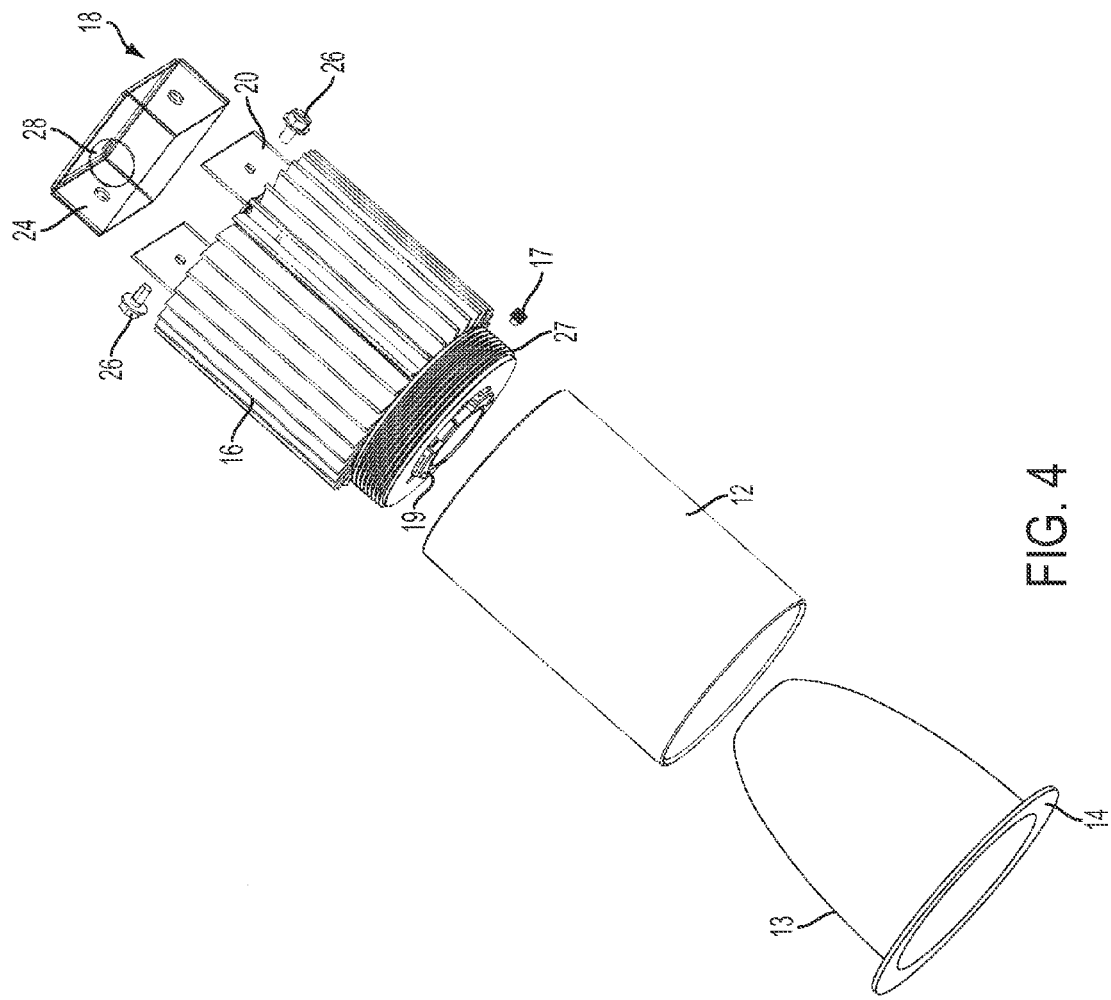
FIG. 4 is an exploded perspective view of the lamp housing of FIG. 3.
Figure 4A:
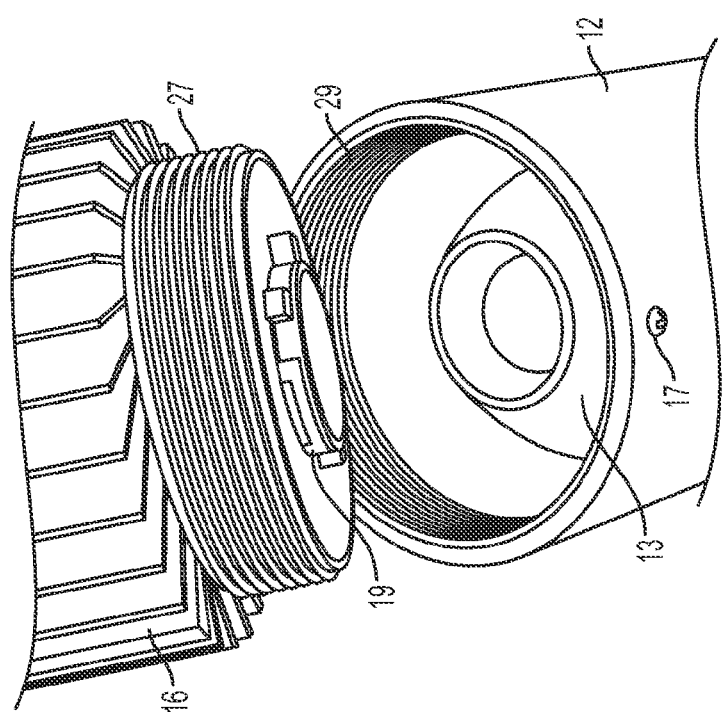
FIG. 4A is a partial perspective view of the lamp housing of FIG. 3, shown in a disassembled state.

A lamp assembly 19 is mounted to the bottom of upper housing 16 so as to be disposed within lower body 12 when the lower body is joined to the upper housing. Light generated by the lamp assembly is dispersed and/or focused by reflector 13, while heat generated by the lamp assembly is dissipated by the finned heat sink of upper housing 16. As used herein, "lamp assembly" means a light source of any type powered by electricity, such as an incandescent lamp (e.g., conventional tungsten filament or halogen), a compact fluorescent lamp, an LED light engine, etc. In the illustrated preferred embodiment, the lamp assembly is an LED light engine, such as a high output XSM LED module manufactured by Xicato (http://www.xicato.com/products.php). As shown in FIGS. 4 and 4A, upper housing 16 is joined to lower body 12, preferably by means of external threads 27 on the mounting ring of lamp assembly 19, those threads mating with internal threads 29 at the upper end of lower body 12. The inherent adjustability of this threaded connection accommodates small variations in the length of reflector 13, which may be due to manufacturing tolerances, allowing for accurate close positioning of the small upper-end aperture of reflector 13 relative to lamp assembly 19 for proper optical performance. A nylon-tipped set screw 17 prevents relative rotation of the threaded parts after adjustment.

Insulated conductors W in protective flexible conduit 30 emerge in top housing 18, extend through upper housing 16 and are connected to lamp assembly 19. Preferably, as seen in FIG. 3A, conductors W terminate in top housing 18 in a first connector half 21, which mates with a second connector half 23 wired via conductors 25 to lamp assembly 19. Such a connector arrangement facilitates removal and replacement of lamp assembly 19. Alternatively, twist-on connectors can be used in top housing 18 to connect conductors W to conductors 25.

Conductors W emerge from the other end of conduit 30 in junction box 40, where they are connected to a power supply 42 as more fully described below. Also within conduit 30 is a flexible tether 36 that emerges in top housing 18 where it is secured by a crimped eye-lug 37 riveted at 38 to the top half 24 of that housing. The other end of tether 36 emerges from conduit 30 in junction box 40 where it is secured to junction box chassis 44 by a crimped eye-lug 46 and a screw 47. The length of tether 36 is selected such that it functions as a strain relief cable to prevent undue strain on the conductors W and their connections, and preferably to prevent undue tensile loading on flexible conduit 30. Tether 36 preferably is conductive and preferably is made of braided galvanized or stainless steel. If metallic, tether 36 provides an electrical grounding bond between lamp housing 10 and junction box 40. The preferred path of tether 36 is through flexible conduit 30 as illustrated, but the tether instead could run externally of the conduit, optionally loosely tied to the conduit by tape, nylon ties or other means.

Referring to FIGS. 5-14, chassis 44 closely surrounds power supply 42, which is mounted in a generally rectangular central aperture 45 in the base of chassis 44. A broad longitudinal mounting flange 48 protruding from one longer side of aperture 45 has two mounting slots 50 near its distal edge. Two additional mounting slots 52 are formed in the base of chassis 44 near the proximal end of flange 48. As seen in FIGS. 5, 8 and 12-14, two mounting straps 54 pass through slots 50, 52 and surround power supply 42 to firmly secure it in position against flange 48. For the sake of simplicity, mounting straps 54 are omitted from FIGS. 9-11.

Nylon cable ties may be used as mounting the straps; however, any suitable mounting hardware could be used depending on the configuration of the power supply and/or any mounting tabs it may have.

Figure 5:
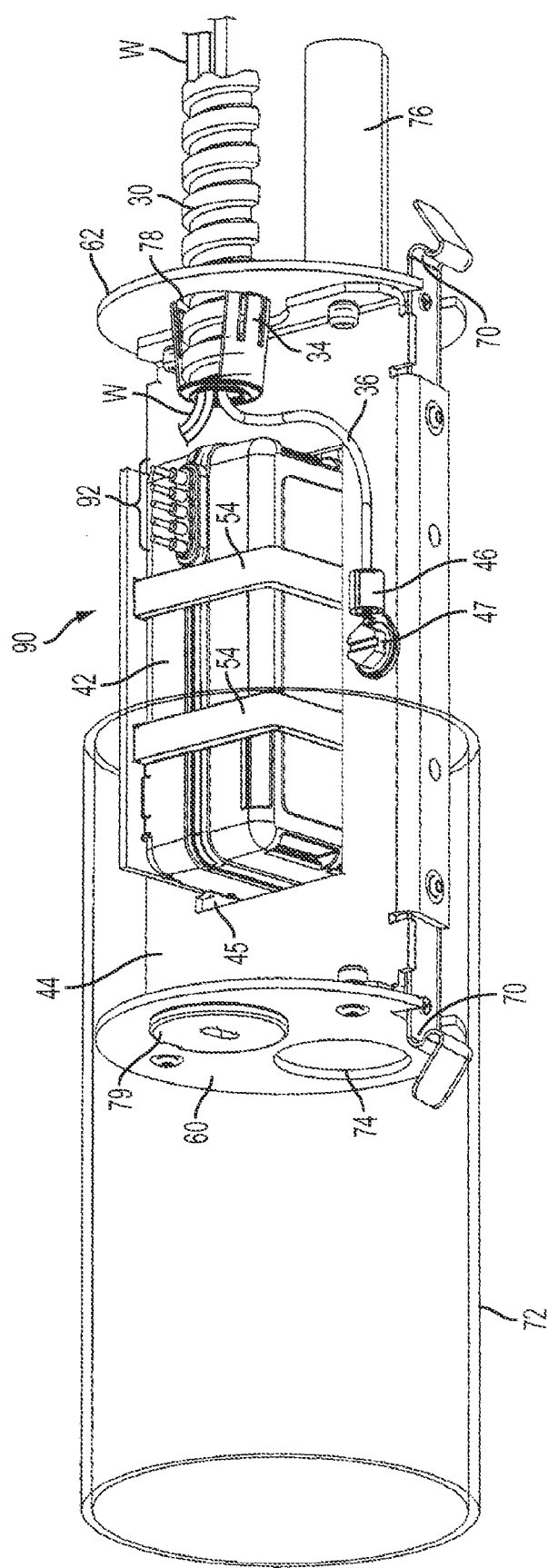
FIG. 5 is an enlarged perspective view of the junction box portion of the lighting fixture of FIG. 1 shown in a partially open condition, the cylindrical cover 72 shown as transparent.
Figure 6:
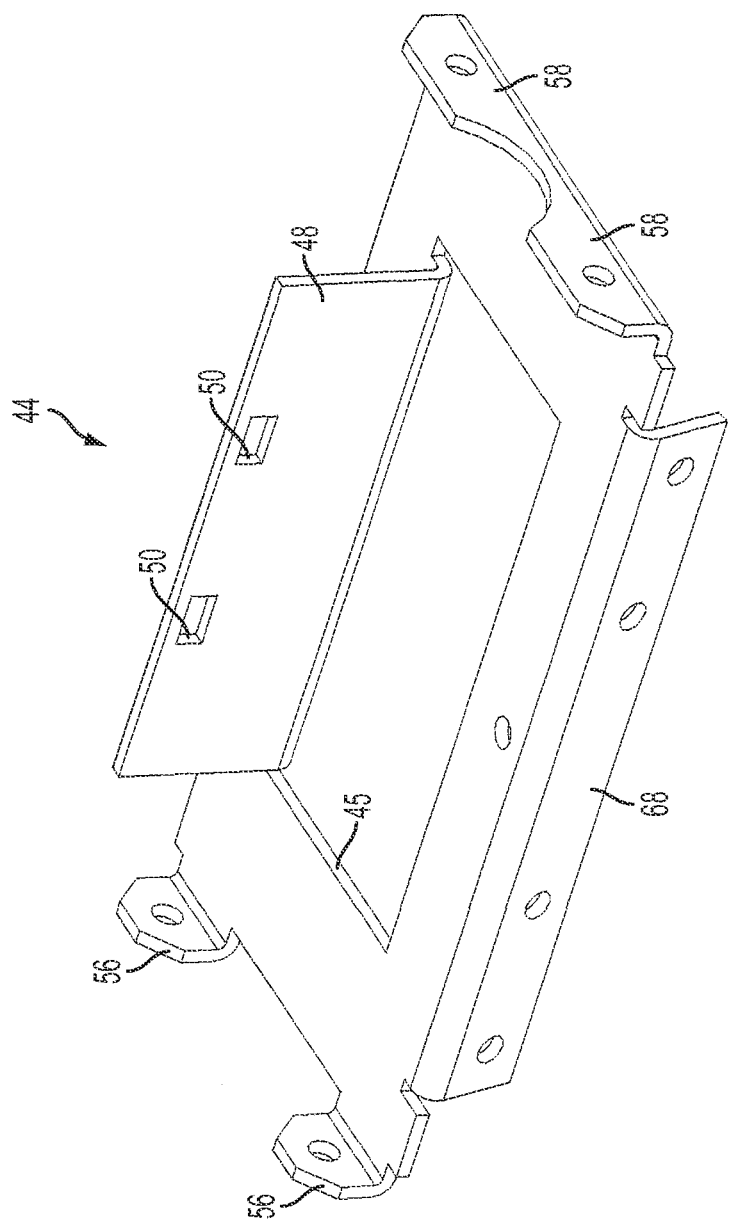
FIG. 6 is a top perspective view of the chassis of the junction box of FIG. 5.
Figure 7:
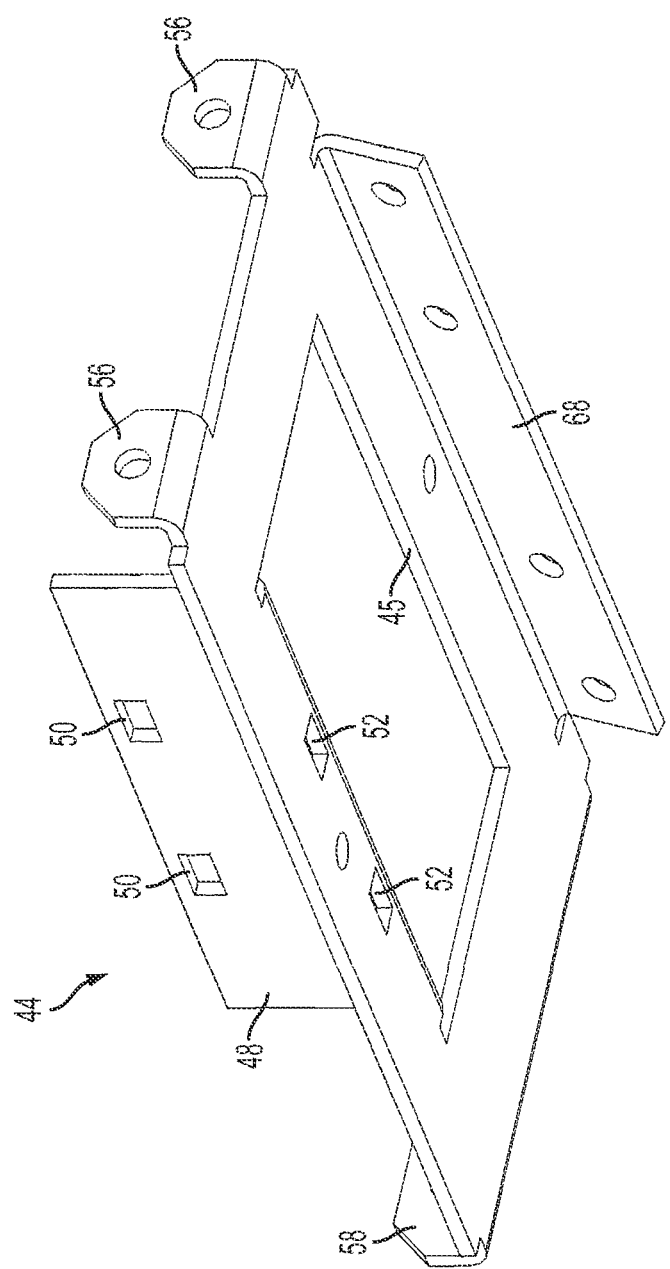
FIG. 7 is a bottom perspective view of the junction box chassis of FIG. 6.
Figure 8:
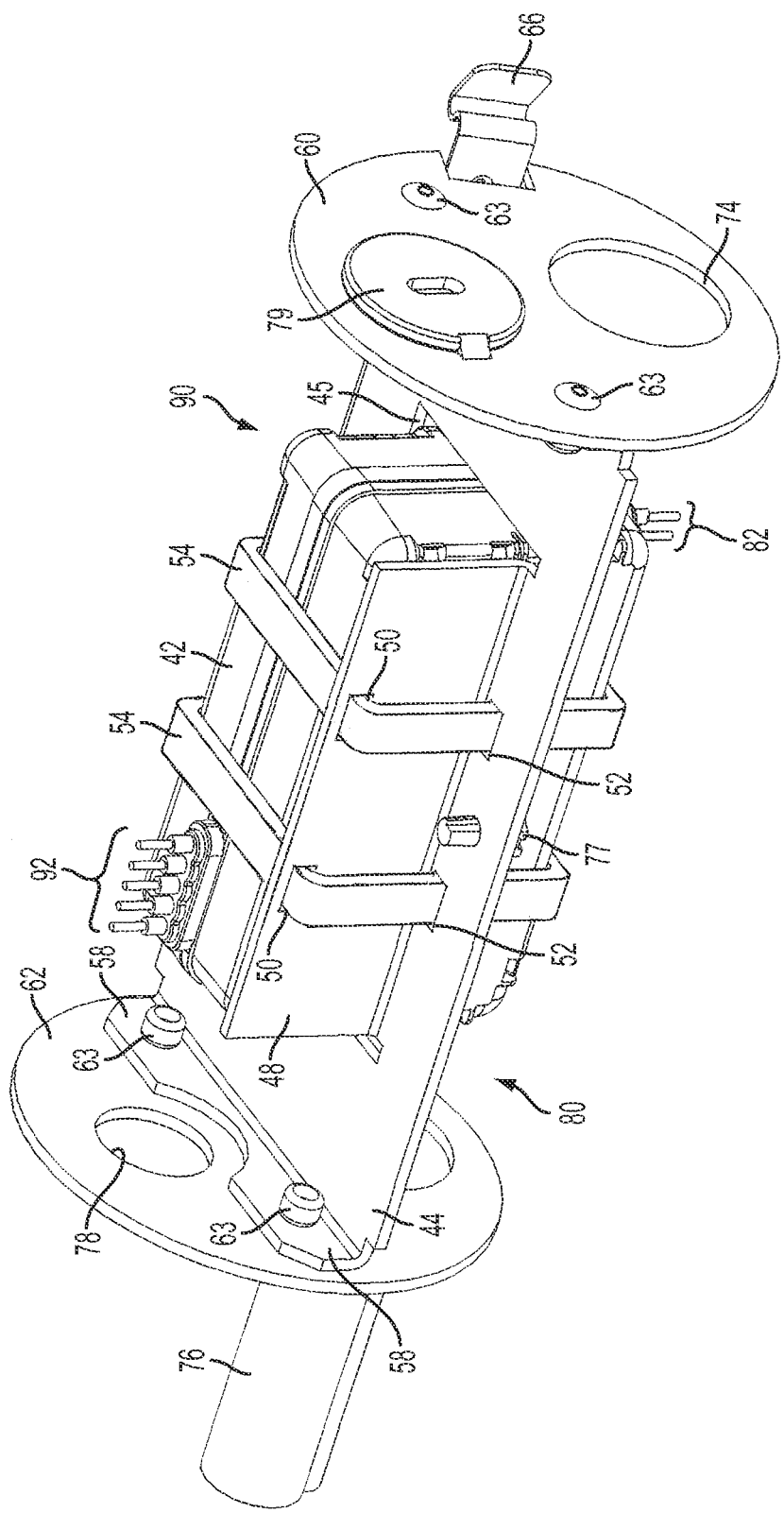
FIG. 8 is a top perspective of the junction box of FIG. 5 without the cylindrical cover.
Figure 9:
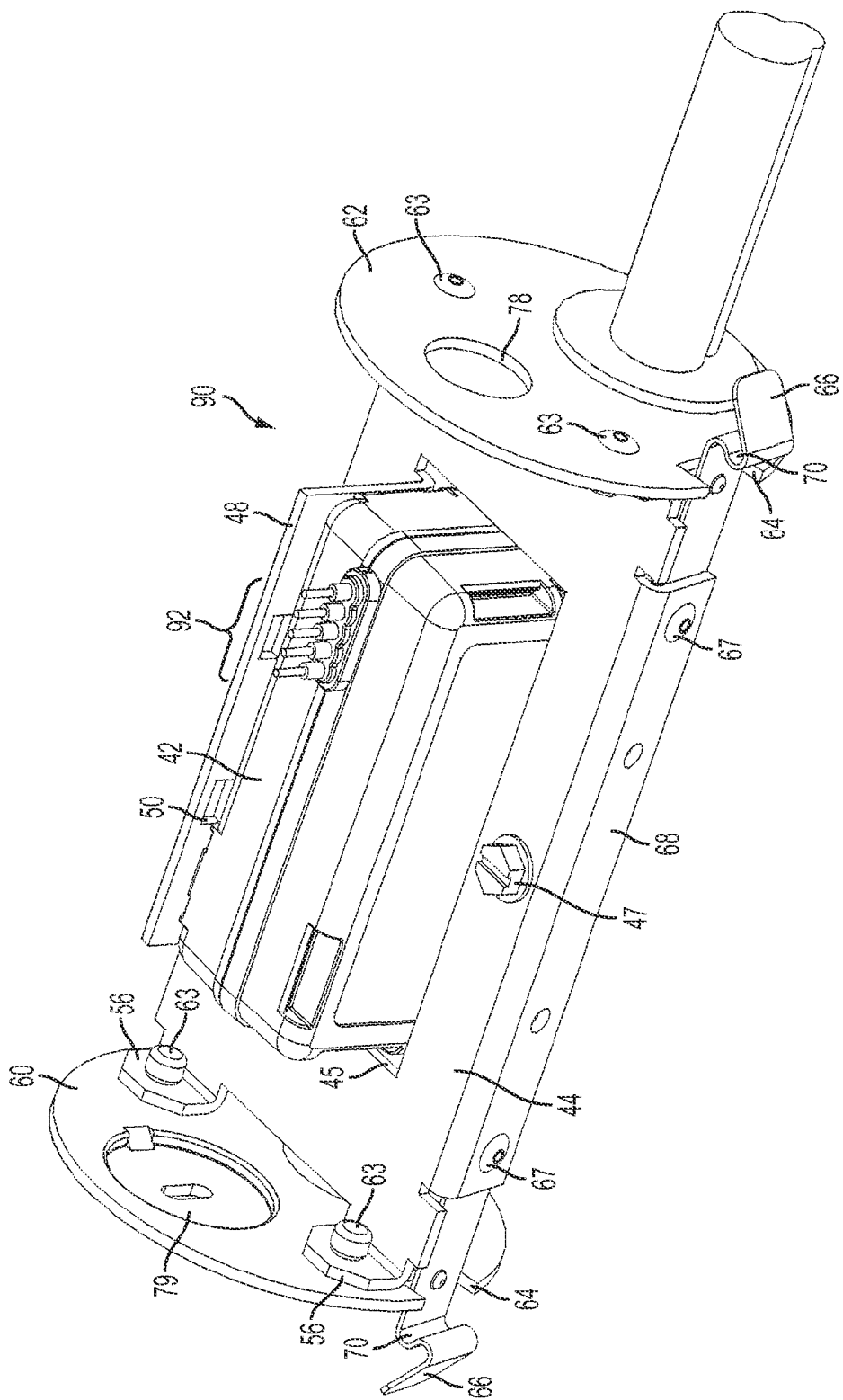
FIG. 9 is a top perspective view of the junction box of FIG. 8 taken from the opposite side.
Figure 10:
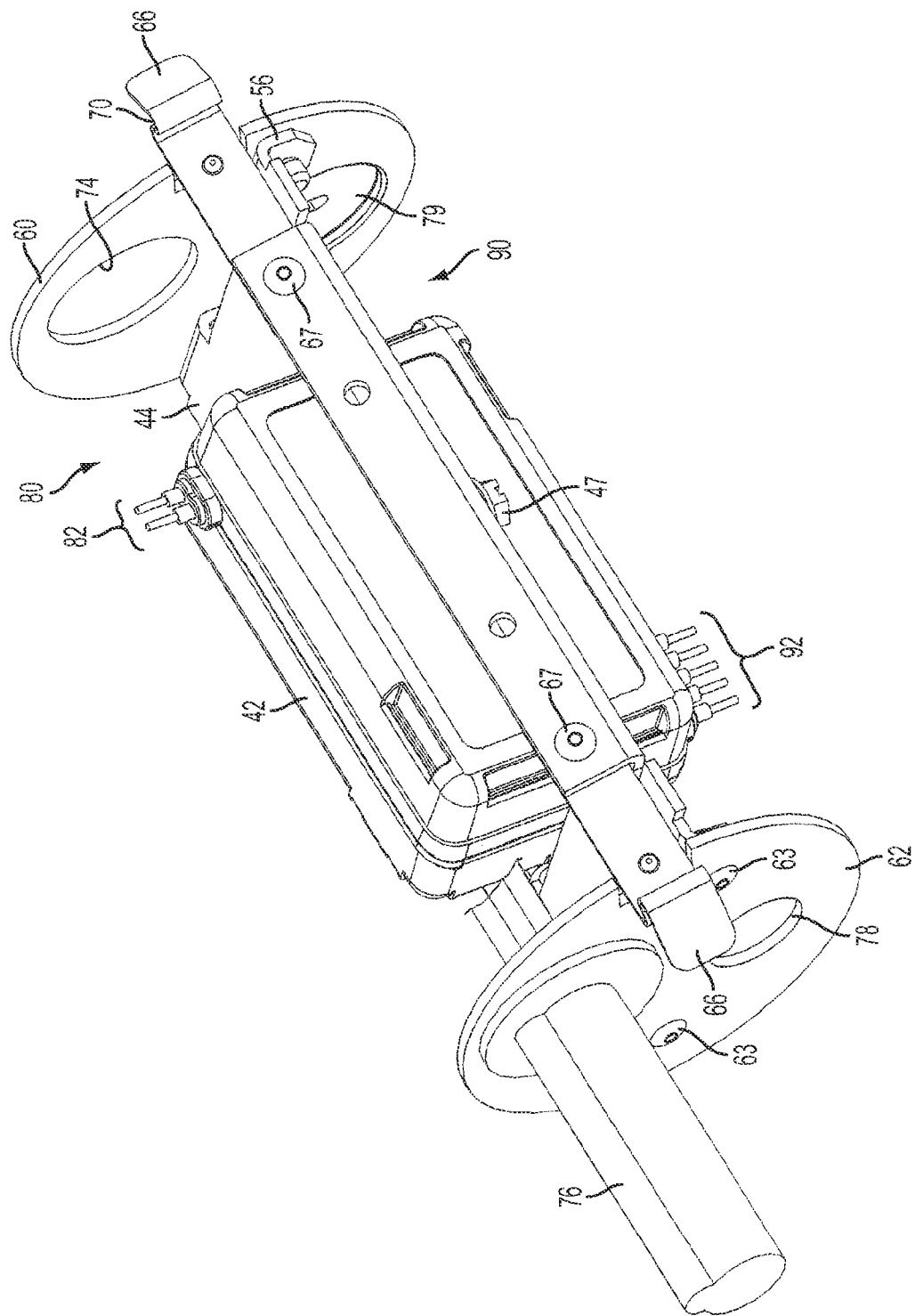
FIG. 10 is a bottom perspective view of the junction box of FIG. 8.

Axially spaced circular end plates 60, 62 are riveted at 63 to apertured tabs 56, 58, respectively, at the ends of chassis 44. Each end plate has a peripheral notch 64 that accommodates a resilient spring clip 66, which is riveted at 67 to a narrow longitudinal flange 68 protruding from one edge of chassis 44. Each of the two spring clips 66 has a shoulder 70 that engages an end of sleeve-like cylindrical cover 72 (see FIGS. 1 and 2), the two shoulders acting as opposing stops to trap the cover in a closed position closely surrounding chassis 44 and end plates 60, 62. Inward finger pressure on either spring clip 66 allows its shoulder 70 to clear the end of cover 72, which can then be slid open axially past the depressed spring clip as shown in FIG. 5 and completely removed, if desired.

Any other suitable arrangement could be used instead of the illustrated spring clips to releasably maintain the cover 72 in a closed position. Such devices could be mounted on chassis 44, on one or both end plates 60, 62 or on the cover 72 itself. By way of example only, each end plate 60, 62 could carry a linearly or pivotally retractable member (spring-loaded or otherwise), which when extended acts as a stop against an end of the cover 72 to keep it closed. Alternatively, one or more screws could secure the cover to chassis flange 68 or to an adjacent tab carried by an end plate. Furthermore, while a right circular cylinder is the preferred shape of the junction box, the shape of the end plates and the matching cross-section of the cylindrical cover could vary somewhat as long as the described functionality is not impaired. In order to facilitate below-ceiling installation and removal of the lighting fixture assembly as described below, the maximum width of the junction box 40 should be no greater than the maximum width of the lamp housing 10 (excluding retention springs 15).

Chassis 44 divides the interior of the junction box into two compartments 80, 90 in which wiring for different voltages is separately maintained. In the preferred embodiment, power supply 42 is a step-down transformer (driver) that converts line (supply) voltage fed to input compartment 80 to a lower voltage for powering the LED light engine of lamp assembly 19 from output compartment 90. Thus, the input leads 82 of power supply 42 are disposed in input compartment 80 (shown with plug-in connectors in FIGS. 12 and 13), while the lower voltage output and control leads 92 are disposed in output compartment 90 (shown with twist-on connectors in FIGS. 12 and 14). As used herein, the term "power supply" broadly means any device that converts, conditions or otherwise modifies or adapts supplied electrical power for a specific load or application.

Figure 11:
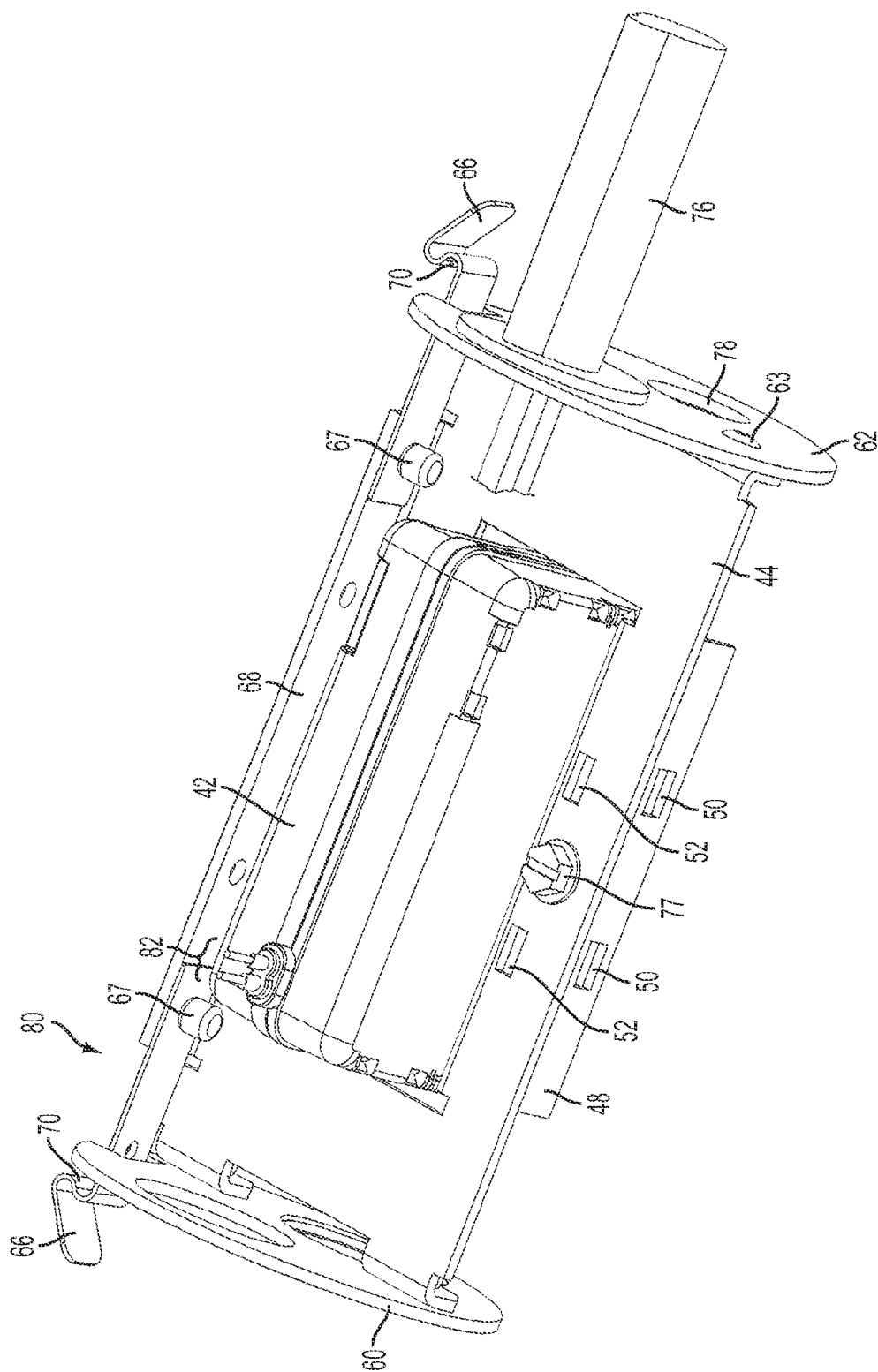
FIG. 11 is a bottom perspective view of the junction box of FIG. 10 taken from the opposite side.
Figure 12:
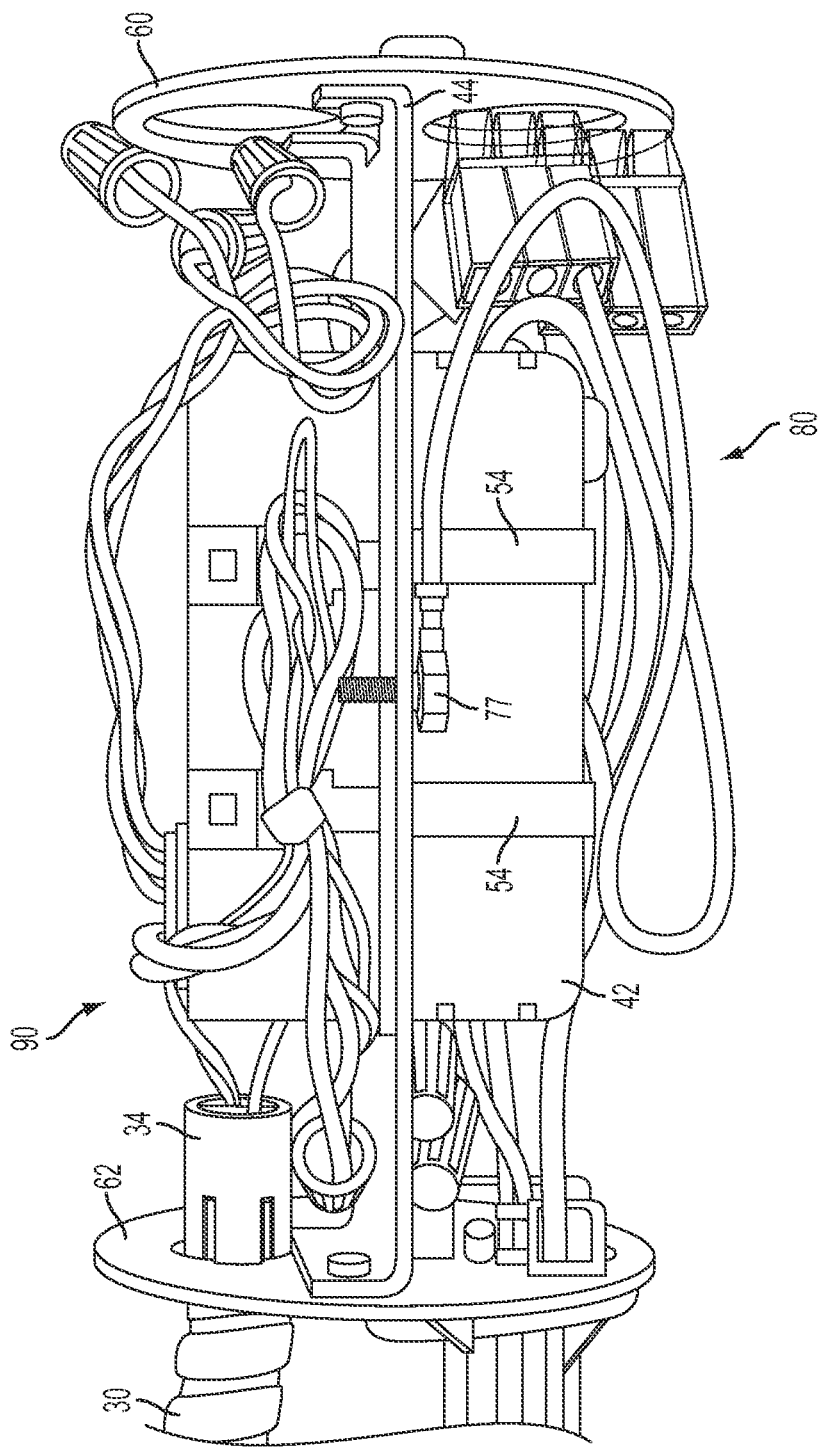
FIG. 12 is a side elevational view of the junction box of FIG. 8 showing wiring in both compartments thereof.
Figure 13:
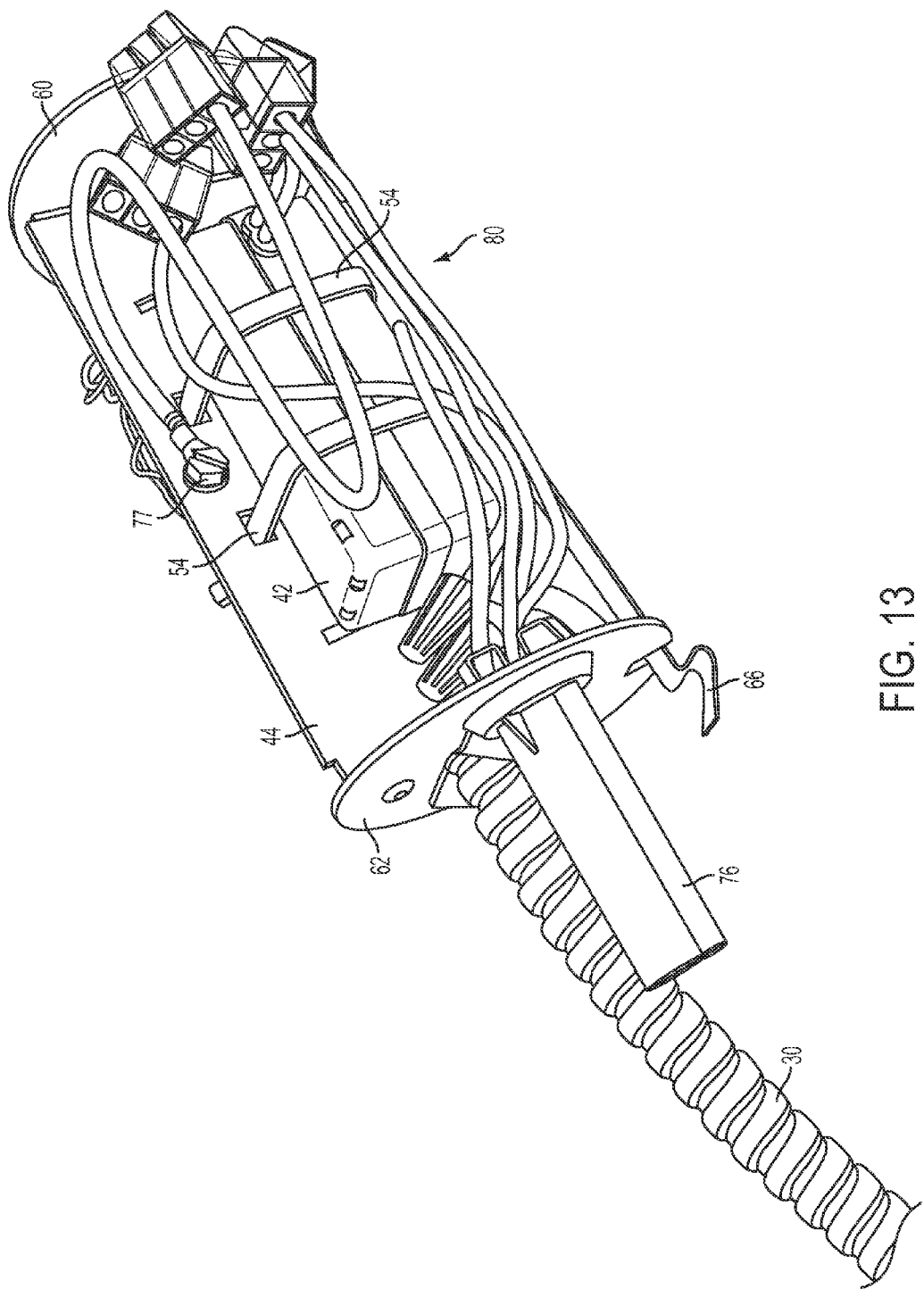
FIG. 13 is a perspective view of the junction box of FIG. 12 showing wiring in the input (supply) compartment thereof.
Figure 14:
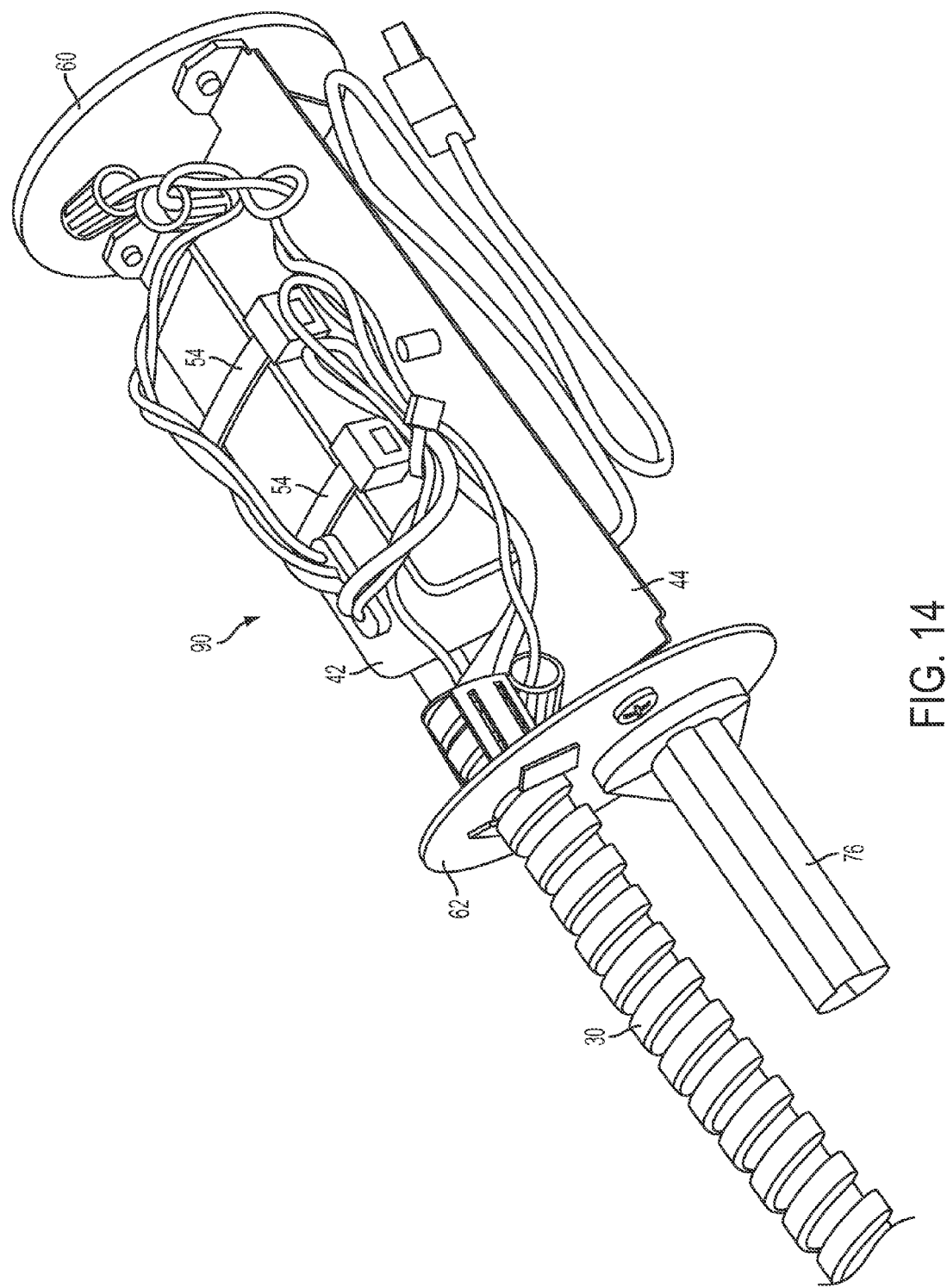
FIG. 14 is a perspective view of the junction box of FIG. 12 showing wiring in the output compartment thereof.

End plate 60 has an opening 74 through which line voltage and ground conductors (not shown) are fed to input compartment 80, which also houses a ground wire (see FIGS. 12 and 13) secured to chassis 44 by a screw 77 (see FIG. 11). Through branch wiring can be accommodated via opening 74 by using an appropriate duplex connector. End plate 62 has an opening that supports a conventional, outwardly projecting thermal protector 76, which is connected to wiring in input compartment 80 (see FIGS. 12 and 13). End plate 62 also has an opening 78 in which an end of conduit 30 is received and is secured by connector 34 (see FIG. 5). Conductors W in conduit 30 thus communicate with lower voltage output compartment 90, where they are connected to driver output leads 92 (see FIGS. 12 and 14). An opening in end plate 60 adjacent output compartment 90 is closed by a knockout 79, which can be removed for the separate entry of low voltage control wiring, such as for a lamp dimming control.

Installation of the lighting fixture assembly is straightforward. Cover 72 is released and slid open over conduit 30 in the direction of lamp housing 10 to expose input compartment 80. Supply wiring above the ceiling is pulled through the fixture installation hole H, passed through and clamped in opening 74 (using an appropriate connector) and connected to input leads 82 and the fixture ground wire. Cover 72 is then slid closed and latched. Junction box 40 is then passed upward through the installation hole H followed by flexible conduit 30. Junction box 40 simply rests on the upper surface of the ceiling. With retention springs 15 squeezed around lower body 12, the lamp housing 10 is pushed upwardly into the installation hole until the springs pop out above the ceiling, locking the fixture in place. A slight clockwise twist of the reflector 13 seats it firmly against the ceiling. The fixture can be removed from the ceiling easily by first twisting the reflector 13 slightly counterclockwise while applying slight downward pressure. Once the retention springs 15 are accessible, they are squeezed together and the lamp housing is pulled down out of the installation hole, followed by flexible conduit 30 and junction box 40.

While a preferred embodiment has been chosen to illustrate the invention, it will be understood by those skilled in the art that various changes and modifications may be made without departing from the scope of the invention as defined by the appended claims. While the lighting fixture of the invention has been described as well-suited for a retrofit, ceiling-supported installation, the lamp housing and junction box components could also be removably mounted on a joist-supported pan or frame above a ceiling. Furthermore, the advantage of compactness realized by the described junction box configuration would make it suitable for use in other applications or situations as long as applicable electrical code requirement are observed.

What is claimed is:

1. A lighting fixture comprising:
   a lamp assembly;
   a reflector for directing light from the lamp assembly;
   a housing having a moveable cover, a first compartment, and a second compartment;
   a power supply positioned in said housing; and
   a conduit receiving a conductor for delivering power from the power supply to the lamp assembly.

2. A lighting fixture assembly of claim 1, wherein the lamp assembly includes an LED light module.

3. A lighting fixture according to claim 1, wherein said power supply occupies a portion of each of said first and second compartments.

4. A lighting fixture according to claim 1, wherein said first compartment is an input compartment and said second compartment is an output compartment.

5. A lighting fixture according to claim 1, wherein said conduit includes a flexible material.

6. A lighting fixture according to claim 5, wherein said conduit includes metal.

7. A lighting fixture according to claim 1, wherein said power supply includes a driver.

8. A lighting fixture according to claim 1, wherein said housing includes a chassis having an aperture for receiving said power supply.

9. A lighting fixture comprising:
a lamp assembly including a lamp housing;
a junction box assembly having a moveable cover, an input for a first conductor carrying power at a first voltage and an output for a second conductor carry power at a second voltage less than said first voltage;
a power supply positioned in said junction box assembly for converting power from said first voltage to said second voltage; and
a movable conduit receiving said second conductor and delivering power from the power supply to the lamp assembly.

10. A lighting fixture assembly of claim 9, wherein the lamp assembly includes an LED light module.

11. A lighting fixture according to claim 9, wherein said power supply includes a driver.

12. A lighting fixture according to claim 9, wherein the lamp assembly includes a heat sink.

13. A lighting fixture according to claim 9, wherein a chassis separates the junction box into a first compartment and a second compartment.

14. A lighting fixture according to claim 13, wherein said power supply is connected to said chassis and occupies a portion of each of said first and second compartments.

15. A lighting fixture according to claim 14, wherein said chassis includes an aperture receiving said power supply.

16. A lighting fixture comprising:
a lamp assembly including a lamp housing having a first maximum width;
a junction box assembly having a moveable cover, an inlet for a high voltage power input, and an outlet for a low voltage power output, the junction box assembly having a second maximum width no greater than the first maximum width;
a power supply positioned in said junction box assembly; and
a conduit connected to said lamp assembly and connected to said junction box assembly.

17. A lighting fixture of claim 16, wherein said lamp assembly includes a reflector and a heat skink.

18. A lighting fixture of claim 16, wherein said conduit is a flexible conduit.

19. A lighting fixture according to claim 16, wherein a chassis separates the junction box into a first compartment and a second compartment.

20. A lighting fixture according to claim 19, wherein said chassis includes an aperture receiving said power supply.

* * * * *